(12) United States Patent
Wu et al.

(10) Patent No.: US 7,556,861 B2
(45) Date of Patent: Jul. 7, 2009

(54) HIGH FREQUENCY-WELDABLE ARTICLES AND METHOD FOR CONNECTING THE SAME

(75) Inventors: Ru-Yu Wu, Tao Yuan (TW); Tsung-Hui Chao, Kaohsiung (TW); Chih-Wei Chu, Chu Pei (TW)

(73) Assignee: Far Eastern Textile Ltd., Taipei (TW)

( * ) Notice: Subject to any disclaimer, the term of this patent is extended or adjusted under 35 U.S.C. 154(b) by 484 days.

(21) Appl. No.: 10/970,864

(22) Filed: Oct. 22, 2004

(65) Prior Publication Data
US 2005/0282005 A1    Dec. 22, 2005

(30) Foreign Application Priority Data
Jun. 18, 2004    (TW) .............................. 93117582 A

(51) Int. Cl.
   B32B 27/06 (2006.01)
   B32B 27/08 (2006.01)
   B32B 27/36 (2006.01)
   C08G 63/16 (2006.01)
   C08G 63/183 (2006.01)

(52) U.S. Cl. .................. 428/480; 428/213; 428/214; 428/343; 428/345; 428/347; 428/349; 428/355 R; 528/302; 528/305; 528/308; 528/308.6

(58) Field of Classification Search ........................ None
See application file for complete search history.

(56) References Cited

U.S. PATENT DOCUMENTS

| | | | | | |
|---|---|---|---|---|---|
| 4,059,715 | A | * | 11/1977 | Pletcher | 428/349 |
| 4,363,853 | A | * | 12/1982 | Imamura et al. | 428/480 |
| 5,204,181 | A | * | 4/1993 | Suzuki et al. | 428/349 |
| 6,513,656 | B2 | * | 2/2003 | Hanaoka et al. | 206/497 |
| 6,521,326 | B1 | * | 2/2003 | Fischer et al. | 428/198 |
| 2003/0021945 | A1 | * | 1/2003 | Kelch | 428/90 |

FOREIGN PATENT DOCUMENTS

| JP | 2001-151996 | * | 6/2001 |
|---|---|---|---|
| JP | 2002-370330 | * | 12/2002 |

* cited by examiner

*Primary Examiner*—Vivian Chen
(74) *Attorney, Agent, or Firm*—Ladas and Parry LLP

(57) ABSTRACT

High frequency-weldable articles, such as sheets or yarns, include at least one high frequency-weldable part that is made from a modified polyethylene terephthalate (PET) material and that has a melting point ranging from 100° C. to 250° C. The modified PET material is prepared from a composition that includes terephthalic acid, ethylene glycol and a diol modifier. The diol modifier is selected from the group consisting of neopentanediol, 1,3-dihydroxy-2-methylpropane, 1,3-dihydroxy-2-methylpropane alkoxylate, 2,5-dimethyl-2, 5-hexanediol, polyethylene glycol, and combinations thereof.

10 Claims, 2 Drawing Sheets

HIGH FREQUENCY-WELDABLE ARTICLES AND METHOD FOR CONNECTING THE SAME

CROSS-REFERENCE TO RELATED APPLICATION

This application claims priority of Taiwanese application no. 093117582, filed on Jun. 18, 2004.

BACKGROUND OF THE INVENTION

1. Field of the Invention

This invention relates to high frequency-weldable articles, such as sheets, fibers, and yarns, and particularly to high frequency-weldable articles that include at least one high frequency-weldable part made from a modified polyethylene terephthalate material. This invention also relates to a method for connecting the high frequency-weldable articles through high frequency welding techniques.

2. Description of the Related Art

Some articles of thermoplastic materials that possess a loss factor property, such as plastic sheets that are made from polyethylene and polypropylene and that are used in food packaging, and filters of air conditioners that are made from polyvinyl chloride or polyurethane, can be laminated quickly and evenly through high frequency welding techniques without using solder material. However, since the use of these halogen-containing materials, such as polyvinyl chloride, will be restricted due to environmental concerns, the relevant industries have attempted to develop high frequency-weldable packaging sheets and fiber filters that are made from halogen-free thermoplastic materials.

Polyethylene terephthalate (PET) is a halogen-free and inexpensive saturated ester that is commercially available and that has a wide range of applications. However, since pure PET has no loss factor property, the articles, such as the plastic sheets, fibers or fiber articles, made therefrom are not suitable for use with high frequency welding techniques.

In recent years, modification of PET and manufacture of PET articles have been focal points in the art of polymers. U.S. Pat. No. 5,585,177 discloses a laminate including a triple layered thermoplastic resin laminated on one or both sides of a metal sheet. The inner layer, which is proximate to the metal sheet, and the outer layer of the triple layered thermoplastic resin are made from modified polyesters. Preferably, the inner and outer layers may be made from isophthalic acid (IPA)-modified PET. Alternatively, the inner layer may be made from a blended polyester resin that is prepared by blending a pure PET (melting point: 256° C.) and a butylene glycol-modified PET (melting point: 252° C.) in equal amounts. However, inclusion of the metal substrate results in a higher production cost and difficulty when recycling the laminate.

U.S. Pat. No. 6,551,699 discloses a calendered sheet made from a calendering composition comprising a modified polyester and a fatty ester. The modified polyester is 1,4-cyclohexanedimethanol (CHDM)-modified PET. The crystallization half time of PET may be prolonged through modification of 1,4-cyclohexane-dimethanol so as to favor the calendering operation. However, the modified polyester can only be dried at a temperature lower than 70° C. When pellets of the modified polyester are processed to form desired articles, a lengthy time for drying or pre-crystallizing the pellets of the modified polyester is required, which results in an increase in the manufacturing costs.

U.S. Pat. No. 5,804,025 discloses a shaped structure made from a modified polyester through high frequency welding techniques. The shaped structure is in the form of a high frequency-weldable staple fiber web that consists of a first fiber and a second fiber. The first fiber is made from PET modified with 33 mol % IPA.

Conventionally, the modified PET is normally produced by addition of bivalent acids, particularly IPA, during polymerization of PET. When IPA is not added to PET in a sufficient amount, such as less than 33 mol %, the modified PET thus made, in spite of being suitable for use in the production of high frequency-weldable thermoplastic sheets, cannot be spun into high frequency-weldable yarns. In other words, the application of the modified PET thus formed is limited.

As the demand for packaging sheets and fiber products is relatively large, there remains a need in the art to improve the high frequency-weldable sheet or fiber product, such as yarn, that is made from a halogen-free, inexpensive modified PET.

SUMMARY OF THE INVENTION

Therefore, the object of the present invention is to provide a high frequency-weldable sheet or yarn that can overcome the aforesaid drawbacks of the prior art.

Another object of this invention is to provide a method for connecting first and second parts, each of which has a high frequency-weldable portion made from a modified PET material, through high frequency welding techniques.

According to one aspect of the present invention, a high frequency-weldable sheet includes a substrate, and a high frequency-weldable layer formed on the substrate and made from a modified PET material that is prepared from a composition including terephthalic acid, ethylene glycol and a diol modifier. The diol modifier is selected from the group consisting of neopentanediol, 1,3-dihydroxy-2-methylpropane, 1,3-dihydroxy-2-methylpropane alkoxylate, 2,5-dimethyl-2,5-hexanediol, polyethylene glycol, and combinations thereof. The high frequency-weldable layer has a melting point ranging from 100° C. to 250° C.

According to another aspect of the present invention, a high frequency-weldable yarn includes fibers composed of a high frequency-weldable material that is made from a modified PET material that is prepared from a composition including terephthalic acid, ethylene glycol and a diol modifier. The diol modifier is selected from the group consisting of neopentanediol, 1,3-dihydroxy-2-methylpropane, 1,3-dihydroxy-2-methylpropane alkoxylate, 2,5-dimethyl-2,5-hexanediol, polyethylene glycol, and combinations thereof. The high frequency-weldable yarn has a melting point ranging from 100° C. to 250° C.

According to yet another aspect of the present invention, a method for connecting first and second parts includes the steps of: (a) preparing the first and second parts in such a manner that each of the first and second parts has a portion composed of a high frequency-weldable material that is made from a modified PET material prepared from a composition including terephthalic acid, ethylene glycol and a diol modifier, the diol modifier being selected from the group consisting of neopentanediol, 1,3-dihydroxy-2-methylpropane, 1,3-dihydroxy-2-methylpropane alkoxylate, 2,5-dimethyl-2,5-hexanediol, polyethylene glycol, and combinations thereof; (b) applying high frequency electromagnetic radiation to the portions of the first and second parts so as to melt the portions of the first and second parts; and (c) joining the melted portions of the first and second parts.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

In view of the foregoing, the applicant of this invention appreciated that a modified PET material can be used in the manufacture of a high frequency-weldable sheet or yarn. The resultant high frequency-weldable sheet or yarn of this invention is free from undesired formation of crystalline in welding area, as commonly encountered during high frequency welding of the conventional modified PET material. Particularly, the modified PET material is modified by addition of specific species of diols and control of the diol amount used during polymerization of the composition for preparing the modified PET material.

Figure 1:
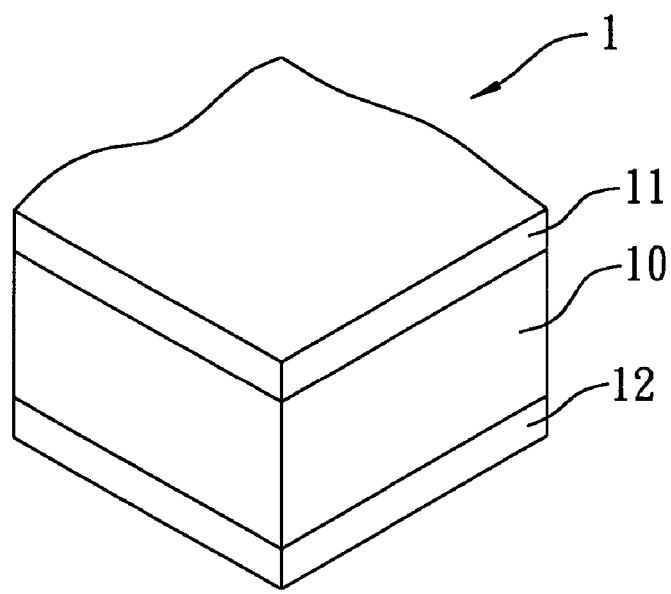
FIG. 1 is a fragmentary perspective view to illustrate the preferred embodiment of a high frequency-weldable sheet according to this invention.

Referring to FIG. 1, the high frequency-weldable sheet 1 according to this invention includes a substrate 10, and a first high frequency-weldable layer 11 formed on the substrate 10 and made from a modified PET material that is prepared from a composition including terephthalic acid, ethylene glycol andadiol modifier.

The melting point of the first high frequency-weldable layer 11 ranges from 100° C. to 250° C., and preferably ranges from 150° C. to 245° C.

The diol modifier included in the composition is selected from the group consisting of neopentanediol, 1,3-dihydroxy-2-methylpropane, 1,3-dihydroxy-2-methylpropane alkoxylate, 2,5-dimethyl-2,5-hexanediol, polyethylene glycol, and combinations thereof. Preferably, the diol modifier is used in an amount ranging from 2 to 40 mol %, more preferably from 5 to 15 mol %, based on total moles of ethylene glycol.

Additionally, the composition may further include a diacid modifier that is selected from the group consisting of IPA, itaconic acid, adipic acid and combinations thereof. Preferably, the diacid modifier is IPA. The diacid modifier is used in an amount ranging from 2 to 20 mol %, based on total moles of terephthalic acid.

The substrate 10 of the high frequency-weldable sheet 1 may be made from a thermoplastic resin. Preferably, the high frequency-weldable sheet 1 is a multi-layered laminate. More preferably, the substrate 10 of the high frequency-weldable sheet 1 is made from a thermoplastic resin selected from the group consisting of PET, polycarbonate, thermoplastic polyurethane, nylon and combinations thereof. Most preferably, the substrate 10 of the high frequency-weldable sheet 1 is made from PET.

Preferably, the high frequency-weldable sheet 1 further includes a second high frequency-weldable layer 12 formed on the substrate 10 such that the substrate 10 is sandwiched between the first and second high frequency-weldable layers 11, 12 to form a tri-ply laminate. Preferably, the first and second high frequency-weldable layers 11, 12 and the substrate 10 are co-extruded to form the tri-ply laminate. Preferably, the second high frequency-weldable layer 12 is also made from the modified PET material. In this tri-ply laminate embodiment, the modified PET material used for manufacturing the first and second high frequency-weldable layers 11, 12 preferably has an intrinsic viscosity ranging from 0.60 to 0.90, more preferably from 0.70 to 0.90. Preferably, each of the first and second high frequency-weldable layers 11, 12 has a weight greater than 3 wt %, and preferably ranging from 3 wt % to 20 wt %, based on total weight of the high frequency-weldable sheet 1.

More preferably, the substrate 10 of the high frequency-weldable sheet 1 may be made from the modified PET material so that the high frequency-weldable sheet 1 is wholly formed from the modified PET material.

The high frequency-weldable sheet 1 according to this invention is suitable for manufacturing packaging materials, such as those for food or and beverages.

The high frequency-weldable yarn according to this invention includes fibers composed of a high frequency-weldable material that is made from the modified PET material as disclosed above. The high frequency-weldable yarn has a melting point ranging from 100° C. to 250° C., preferably ranging from 150° C. to 245° C. Preferably, the modified PET material for forming the fibers of the high frequency-weldable yarn according to this invention has an intrinsic viscosity ranging from 0.5 to 0.8.

Figure 2:
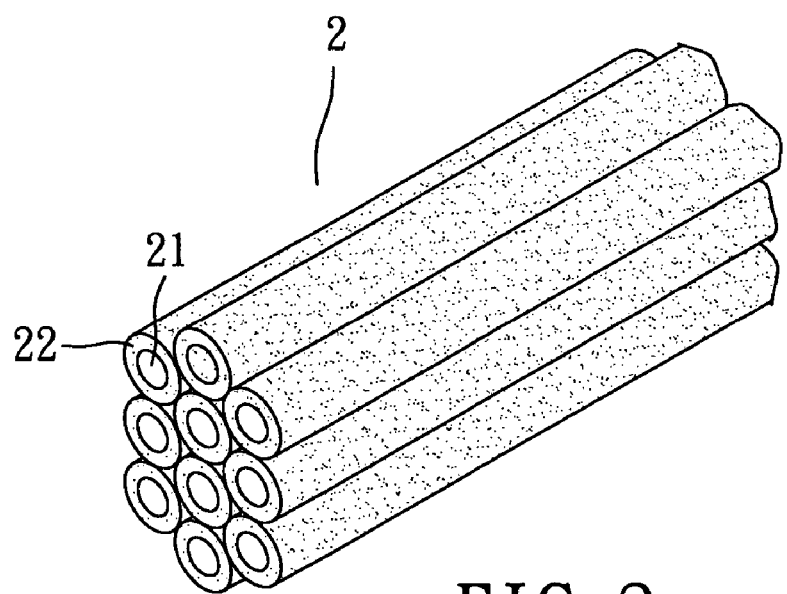
FIG. 2 is a fragmentary perspective view to illustrate the first embodiment of a high frequency-weldable yarn according to this invention.

Referring to FIG. 2, in one preferred embodiment, the fibers of the high frequency-weldable yarn 2 according to this invention may be further composed of a thermoplastic material. Preferably, each of the fibers has a core 21 that is made from the thermoplastic material, and an outer layer 22 that encloses the core 21 and that is made from the high frequency-weldable material.

Figure 3:
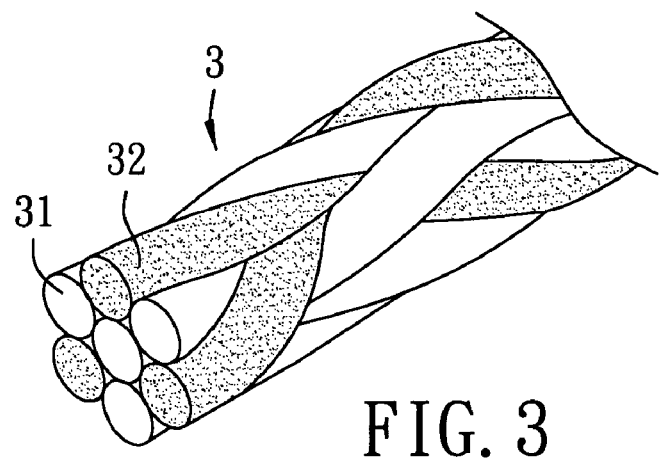
FIG. 3 is a fragmentary perspective view to illustrate the second embodiment of a high frequency-weldable yarn according to this invention.

Referring to FIG. 3, in another preferred embodiment, the high frequency-weldable yarn 3 according to this invention may be formed by blending first fibers 31 composed of the thermoplastic material and second fibers 32 composed of the modified PET material. Preferably, the high frequency-weldable material is used in an amount ranging from 10 wt % to 100 wt %, based on total weight of the first fibers 31 and the second fibers 32. More preferably, the second fibers 32 composed of the modified PET material have a fiber fineness (denier/filament, d/f) ranging from 0.7 to $6.0^{d/f}$, and a length ranging from 2 mm to 80 mm. The thermoplastic material is preferably selected from the group consisting of PET, polybutylene terephthalate, nylon and combinations thereof.

The high frequency-weldable yarn 2 (3) according to this invention is suitable for manufacturing filters or interlinings. For example, the high frequency-weldable yarn 2 (3) according to this invention may be used for forming cords through cross-lapping, spinning, needling or knitting techniques. Preferably, when the high frequency-weldable yarn 2 (3) is used for knitting a non-woven cord, the non-woven cord has a basic weight ranging from 50 to 1000 $g/cm^2$.

The modified PET material used for manufacturing the high frequency-weldable articles, such as sheets 1 or yarns 2 (3), according to this invention requires to be dried before processing, so as to reduce water content in the modified PET material and to avoid formation of bubbles during processing. Surprisingly, the modified PET material used for manufacturing the high frequency-weldable sheet 1 or yarn 2 (3) according to this invention can be dried at a higher temperature than that of the conventional CHDM-modified PET material without degrading the structure of the modified PET material. Particularly, the modified PET material used in this invention can be dried under a temperature as high as 160° C., thereby saving the operation time required for manufacturing the high frequency-weldable articles.

Figure 4:
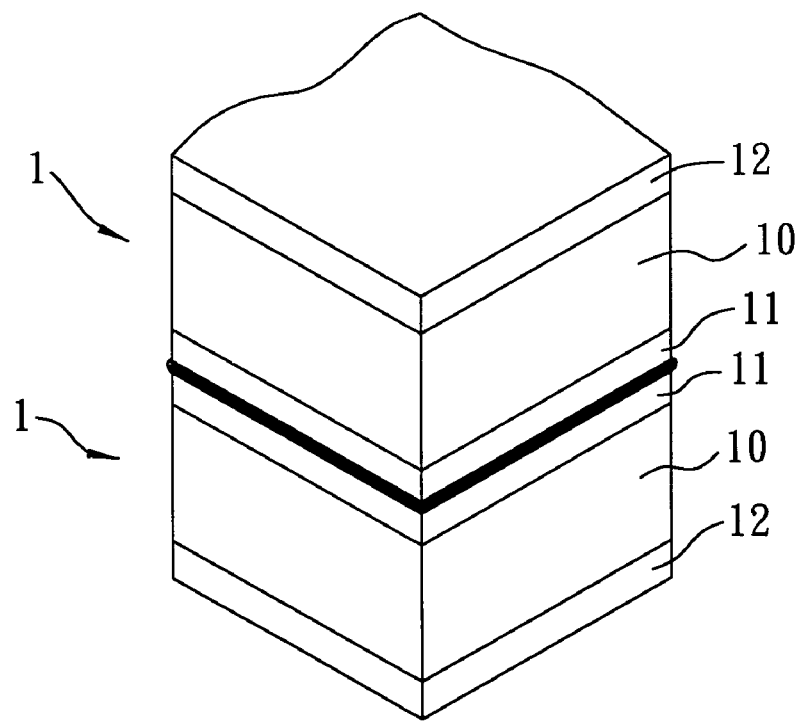
FIG. 4 is a fragmentary perspective view to illustrate how two high frequency-weldable sheets are interconnected according to a method for connecting two parts of this invention.

The modified PET material of this invention is suitable for use in connecting first and second parts of a high frequency-weldable article according to a method of this invention. The method includes the steps of: (a) preparing the first and second parts, such as the high frequency-weldable sheets 1 in such a manner that each of the first and second parts has a portion composed of a high frequency-weldable material that is made from the modified PET material as described above; (b) applying high frequency electromagnetic radiation to the portions of the first and second parts so as to melt the portions of the first and second parts; and (c) joining the melted portions of the first and second parts. In one preferred embodiment as shown in FIG. 4, two high frequency-weldable sheets 1 shown in FIG. 1 are welded together according to the method of this invention by connecting the first high frequency-weldable layer 11 of one high frequency-weldable sheet 1 to either one of the first and second high frequency-weldable layers 11, 12 of the other high frequency-weldable sheet 1.

Preferably, before step (a), the modified PET material is pre-heated to a temperature higher than 70° C., more preferably ranging from 70° C. to 160° C., and most preferably ranging from 100° C. to 160° C.

In addition, the operating parameters suitable for high frequency welding of the high frequency-weldable articles, such as sheets 1 or yarns 2 (3), according to the method of this invention are: frequency: 10 to 200 MHz, power density: 5 to 50 W/cm$^3$, and welding time: 4 to 20 seconds.

Many other variations, modifications, and alternative embodiments may be made in the articles and techniques described, by those skilled in the art, without departing from the concept of the present invention. Accordingly, it should be clearly understood that the articles and method referred to in the foregoing description and following examples are illustrative only and are not intended as limitations on the scope of this invention.

EXAMPLE 1

I. Preparation of the Modified PET Material

Terephthalic acid, ethylene glycol and 1,3-dihydroxy-2-methylpropane were added into a mixing vessel in a molar ratio of 1:1.15:0.10, and were mixed together to form a paste. 50 ppm of an antioxidant (5.6% of phosphoric acid, $H_3PO_4$) was added into the paste. Thereafter, the resultant paste was poured into an esterification reactor. The esterification reaction was conduced for 7 to 9 hours. A polymerizate (esterified product) was obtained and was subsequently transferred to a polymerization vessel, to which 300 ppm of $Sb_2O_3$ and 50 ppm of $Co(OAc)_2$ were added as a catalyst. The temperature of the polymerization vessel was elevated to 285° C. for a period of time until a modified PET material having an intrinsic viscosity ranging from 0.8 to 0.9 was obtained. The modified PET material thus made has a melting point of 227° C., and was diced into pellets.

II. Manufacture of Thermoplastic Sheets

The pellets composed of the modified PET material and prepared according to the procedures set forth in part I of this Example and an unmodified PET material in a weight ratio of 20:80 were added to an extruder (manufactured by Bruckner Co., trade name D83313-Siegsdorf). The temperature of the extruder is set at about 270° C. Two outer layers composed of modified PET material, and an interlayer composed of unmodified PET material and sandwiched between the two outer layers were co-extruded in the extruder so as to form a high frequency-weldable thermoplastic sheet of a tri-ply structure. The thickness ratio of the interlayer and the two outer layers was 8:1:1.

III. High Frequency Welding Test

The high frequency-weldable thermoplastic sheet obtained from the procedures set forth in part II of this Example was subjected to a high frequency welding test by welding portions thereof via a high frequency welding machine (a foot pneumatic plastic welding machine, Model no. 4-8 KW, manufactured by Jyh Yih Electric Enterprise Co., Ltd., Taiwan). The parameters used in the test were: frequency: 27.12 MHz, pressure: 5 bar, power density: 40 W/cm$^3$, and welding time: 4 to 10 seconds. The effect of the welded portions of the thermoplastic sheet was examined by manually peeling the welded portions of the thermoplastic sheet. The test results show that the welded portions of the thermoplastic sheet manufactured by this Example were well bonded and were difficult to be peeled off. In addition, the welded portions of the thermoplastic sheet remain transparent, and no crystallization was formed therein.

EXAMPLE 2

The thermoplastic sheet of this Example was prepared in a manner similar to that of Example 1, except that the terephthalic acid, ethylene glycol and 1,3-dihydroxy-2-methylpropane used for preparing the modified PET material were in a molar ratio of 1:1.15:0.20. The melting point of the modified PET material thus formed was 208° C. The thermoplastic sheet prepared by this Example was subjected to the high frequency welding test. The test results show that the welded portions of the thermoplastic sheet remain transparent, and no crystallization was formed therein.

EXAMPLE 3

The thermoplastic sheet of this Example was prepared in a manner similar to that of Example 2, except that 2,5-dimethyl-2,5-hexanediol was used to substitute 1,3-dihydroxy-2-methylpropane. The melting point of the modified PET material thus formed was 240° C. The thermoplastic sheet prepared by this Example was subjected to the high frequency welding test. The test results show that the welded portions of the thermoplastic sheet remain transparent, and no crystallization was formed therein.

EXAMPLE 4

The thermoplastic sheet of this Example was prepared in a manner similar to that of Example 1, except that the modified PET material and the unmodified PET material added to the extruder were in a weight ratio of 15:85, and that the thickness ratio of the interlayer and the two outer layers was 11.3:1:1. The thermoplastic sheet prepared by this Example was subjected to the high frequency welding test. The test results show that the welded portions of the thermoplastic sheet remain transparent, and no crystallization was formed therein.

EXAMPLE 5

The thermoplastic sheet of this Example was prepared in a manner similar to that of Example 1, except that the modified PET material and the unmodified PET material added to the extruder were in a weight ratio of 10:90, and that the thickness ratio of the interlayer and the two outer layers was 18:1:1. The thermoplastic sheet prepared by this Example was subjected to the high frequency welding test. The test results show that the welded portions of the thermoplastic sheet remain transparent, and no crystallization was formed therein.

EXAMPLE 6

The thermoplastic sheet of this Example was prepared in a manner similar to that of Example 1, except that isophthalic acid was added into the mixing vessel for preparing the modified PET material. The molar ratio of terephthalic acid, isophthalic acid, ethylene glycol, and 1,3-dihydroxy-2-methylpropane was 1:0.02:1.2:0.16. The melting point of the modified PET material thus formed was 226° C. The thermoplastic sheet prepared by this Example was subjected to the high frequency welding test. The test results show that the welded portions of the thermoplastic sheet remain transparent, and no crystallization was formed therein.

EXAMPLE 7

The thermoplastic sheet of this Example was prepared in a manner similar to that of Example 6, except that the molar ratio of terephthalic acid, isophthalic acid, ethylene glycol, and 1,3-dihydroxy-2-methylpropane was 1:0.02:1.2:0.08. The melting point of the modified PET material thus formed was 218° C. The thermoplastic sheet prepared by this Example was subjected to the high frequency welding test. The test results show that the welded portions of the thermoplastic sheet remain transparent, and no crystallization was formed therein.

EXAMPLE 8

The thermoplastic sheet of this Example was prepared in a manner similar to that of Example 6, except that neopentanediol was used to substitute 1,3-dihydroxy-2-methylpropane. The melting point of the modified PET material thus formed was 208° C. The thermoplastic sheet prepared by this Example was subjected to the high frequency welding test. The test results show that the welded portions of the thermoplastic sheet remain transparent, and no crystallization was formed therein.

EXAMPLE 9

The thermoplastic sheet of this Example was prepared in a manner similar to that of Example 8, except that the molar ratio of terephthalic acid, isophthalic acid, ethylene glycol, and neopentanediol was 1:0.02:1.2:0.08. The melting point of the modified PET material thus formed was 215° C. The thermoplastic sheet prepared by this Example was subjected to the high frequency welding test. The test results show that the welded portions of the thermoplastic sheet remain transparent, and no crystallization was formed therein.

EXAMPLE 10

The thermoplastic sheet of this Example was prepared in a manner similar to that of Example 6, except that polyethylene glycol (MW. 1000) was used to substitute 1,3-dihydroxy-2-methylpropane. The melting point of the modified PET material thus formed was 230° C. The thermoplastic sheet prepared by this Example was subjected to the high frequency welding test. The test results show that the welded portions of the thermoplastic sheet remain transparent, and no crystallization was formed therein.

EXAMPLE 11

I. Preparation of the Modified PET Material

The modified PET material was prepared in a manner similar to that of Example 8, except that the esterification reaction stopped at a point where the intrinsic viscosity of the modified PET material was 0.6 to 0.8.

II. Manufacture of a High Frequency Weldable Cord

The pellets composed the modified PET material and prepared according to the procedures set forth in part I of this Example were laddered to form high frequency-weldable fibers having a fiber fineness of 2.0 d×0.51 mm. The high frequency-weldable fibers and pure PET fibers were blended together in a weight ratio of 30:70 to form yarns that were subsequently formed into a cord. The basic weight of the cord thus formed was 500 g/cm$^2$.

III. High Frequency Welding Test

The high frequency welding test of the cord thus formed was conducted in the same manner as that of Example 1. The test results show that the welded portions of the thermoplastic cord remain transparent, and no crystallization was formed therein.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. A high frequency-weldable sheet, comprising a substrate, and a first high frequency-weldable layer formed on said substrate and consisting of a modified polyethylene terephthalate material that is prepared from a composition comprising terephthalic acid, ethylene glycol and a diol modifier, said diol modifier being selected from the group consisting of neopentanediol, 1,3-dihydroxy-2-methylpropane, 1,3-dihydroxy-2-methylprop alkoxylate, 2,5-dimethyl-2,5-hexanediol, polyethylene glycol, and combinations thereof, said first high frequency-weldable layer having a melting point that is at least 208° C. and is up to 250° C., said high frequency-weldable sheet further comprising a second high frequency-weldable layer formed on said substrate such that said substrate is sandwiched between said first and second high frequency-weldable layers, said second high frequency-weldable layer being made from said modified PET material, said modified polyethylene terephthalate material being prepared such that, when said high frequency-weldable sheet is subjected to welding at high frequency, a welded area of said modified polyethylene terephthalate material does not comprise a crystalline structure.

2. The high frequency-weldable sheet of claim 1, wherein, based on total moles of ethylene glycol, said diol modifier is used in an amount ranging from 2 to 40 mol %.

3. The high frequency-weldable sheet of claim 2, wherein, based on total moles of ethylene glycol, said diol modifier is used in an amount ranging from 5 to 15 mol %.

4. The high frequency-weldable sheet of claim 1, wherein said composition further comprises a diacid modifier selected from the group consisting of isophthalic acid, itaconic acid, adipic acid, and combinations thereof.

5. The high frequency-weldable sheet of claim 4, wherein said diacid modifier is isophthalic acid.

6. The high frequency-weldable sheet of claim 4, wherein, based on total moles of terephthalic acid, said diacid modifier is used in an amount ranging from 2 to 20 mol %.

7. The high frequency-weldable sheet of claim 1, wherein said substrate is made from a thermoplastic resin.

8. The high frequency-weldable sheet of claim 1, wherein said modified PET material has an intrinsic viscosity ranging from 0.60 to 0.90.

9. The high frequency-weldable sheet of claim 1, wherein, based on total weight of said high frequency-weldable sheet, each of said first and second high frequency-weldable layers has a weight ranging from 3 wt % to 20 wt %.

10. The high frequency-weldable sheet of claim 1, wherein the melting point of said first high frequency-weldable layer is no greater than 240° C.

* * * * *